UNITED STATES PATENT OFFICE.

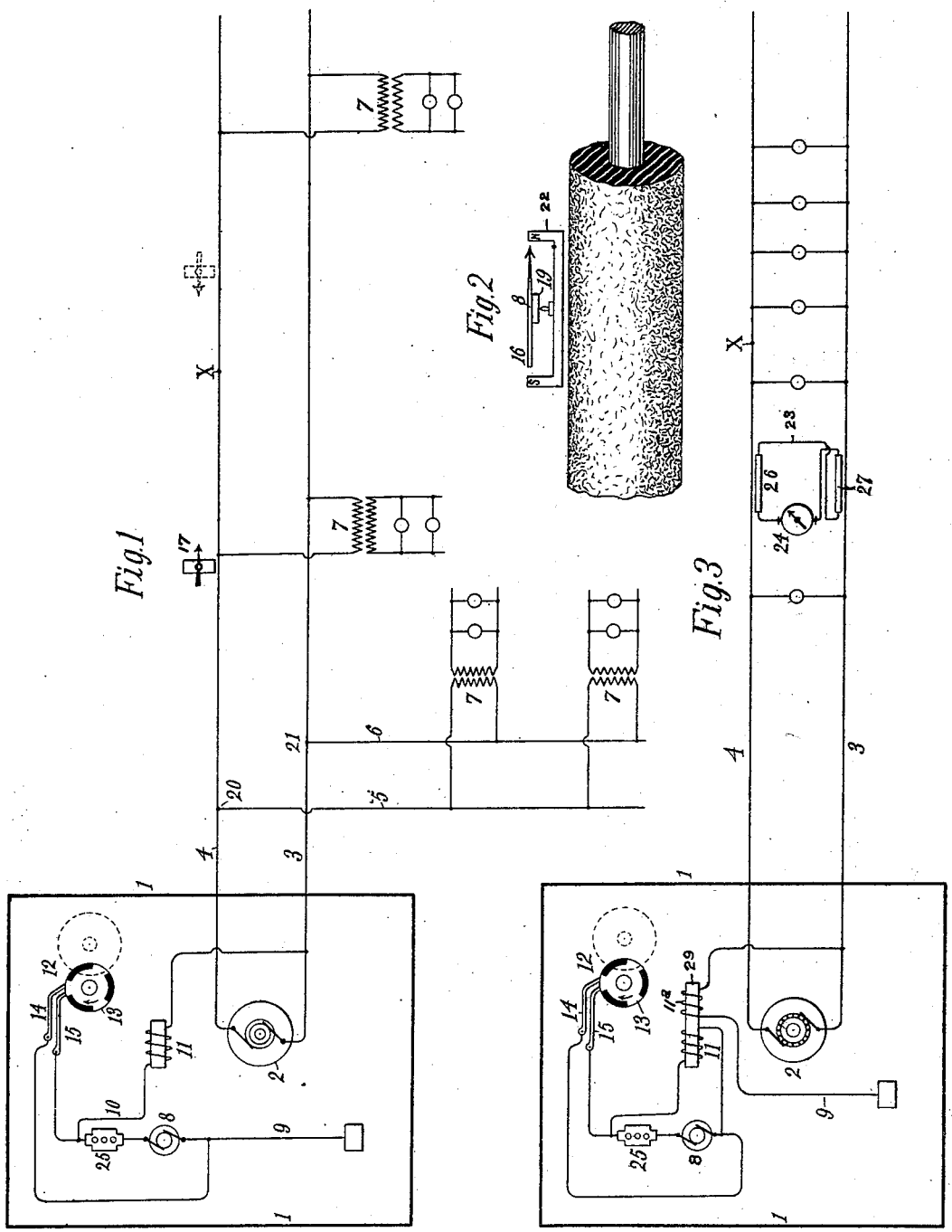

THOMAS W. VARLEY, OF NEW YORK, N. Y.

METHOD OF LOCATING FAULTS IN ELECTRICAL CIRCUITS.

SPECIFICATION forming part of Letters Patent No. 689,253, dated December 17, 1901.

Application filed March 30, 1901. Serial No. 53,585. (No model.)

*To all whom it may concern:*

Be it known that I, THOMAS W. VARLEY, a citizen of the United States, and a resident of New York, in the county of New York and State of New York, have invented certain new and useful Improvements in Methods of Locating Faults in Electric Circuits, of which the following is a specification.

My invention relates to a method of locating faults in electric cables carrying electric currents.

The general plan of the invention is to connect with the cable forming the circuit upon which it is desired to locate a fault a supplemental source of electric currents having such characteristics with reference to the characteristics of the current normally traversing the cable that an indicating device moved from point to point along the cable will be so affected as to indicate the direction from the point of observation at which the fault is present, and thus by successive applications thereof exactly locate the position of the fault.

The invention is applicable to systems carrying either alternating currents or continuous currents, but for convenience of illustration will be described more particularly in connection with an alternating-current system. In such system without disconnecting the source of supply of alternating currents a suitable source of continuous currents is connected at one pole with the earth and at the other pole with some convenient portion of the cable or circuit in which a fault is to be located. The continuous current therefore completes its circuit to a greater or less extent through the earth by way of the fault. A compass or magnetic needle suitably mounted if placed adjacent to the cable carrying continuous current without reference to the alternating current will be influenced by reason of the continuous current and tend to take a position at right angles to the flow of the continuous current, the north-seeking pole of the compass tending to point toward the right-hand side of a cable above which it is placed when the current flows in a direction from the observer. It will be understood, however, that in the usual construction of underground cables and manholes more or less magnetic material being present the disturbing influences are such that the earth's attraction is necessarily considerably interfered with, and some means must be provided for determining the direction of the continuous current flowing through the conductor as distinguished from the outside influences. I therefore usually provide means for causing a regular determined interruption of the flow of the continuous current and for reasons which will appear cause the cessations in the flow of current to be of a different duration from the continuations thereof. Thus, for instance, the current may be allowed to flow for eight seconds and then interrupted for four seconds. If, therefore, the observer notices that the needle tends to occupy a certain position for eight seconds and then a different position for the succeeding four seconds, it will be apparent that the position occupied during the eight seconds is the one resulting from the influence of the flow of current, and by observing the position of the needle it is possible to determine the direction of the flow of the direct current, and hence the direction in which the fault is located. For convenience a pointer may be carried by the magnetic needle or compass, which by occupying a position at right angles to the length of the compass-needle can be utilized to point always in the direction in which to search for the fault when the continuous current is flowing.

It sometimes may chance that the local conditions in a given manhole are such that the natural tendency of the needle will be to stand in the same direction whether the continuous current is flowing or not through the cable. Any suitable means—such, for instance, as a supplemental magnet—may be then employed for causing the needle to stand at an angle parallel to the cable when no continuous current is flowing therethrough.

In the accompanying drawings, Figure 1 is a diagram showing a general organization of circuits and apparatus for illustrating the invention; and Fig. 2 is an enlarged view of a section of cable, showing the indicating devices in connection therewith. Fig. 3 illustrates a modification.

Referring to the drawings, 1 represents a central station in which is located any suitable source 2 of electric currents. In this instance it is assumed to be a source of alternating currents. Main-line conductors 3 4 5 6 are led from the station in the usual manner and these are represented as having the primary coils 7 of transformers connected in parallel therewith.

At the point X it is assumed that a fault or leak in the main cable has occurred. At the central station there is provided any suitable source of continuous current, such as represented at 8. One pole of this source is connected with the earth by a conductor 9. The other pole is connected by a conductor 10 through a reactive device 11 with one leg—say 3—of the main line. The reactive coil is employed for the purpose of enabling the connection of the conductor 10 to be made with either side of the main circuit, for it is evident that if the connection were made direct from the source of continuous current to the main circuit in such manner that the leak or grounding of the main circuit were to form with the grounded side of the direct-current source a local circuit for the alternating currents then without the protective effects of the reactive coil the apparatus might be destroyed.

For the purpose of causing successive impulses of definite duration to traverse the circuit I employ any suitable form of controlling device—such, for instance, as a rotating circuit-closer 12, which in this instance is adapted to shunt continuous current from the conductor 10 at definite intervals. For this purpose it is provided with successive contact-plates 13, which pass beneath two contact-arms 14 and 15, which are connected, respectively, with the opposite poles of the source, and thus when these contact-brushes both rest upon one of the contact-segments the continuous current will be shunted from the alternating-current circuit. As already stated, the intervals of opening and closing this shunt-circuit are regulated so that the duration of the one shall be different from that of the other.

An adjustable resistance 25 may be included in the continuous-current circuit for the purpose of regulating the strength of the current permitted to flow through the main circuit.

The indicating device is illustrated at 16 and consists of a magnetic needle or bar 17, suitably pivoted and free to revolve in the manner of a compass-needle. A pointer 18 is shown as being carried by the magnetic bar 19, so arranged with respect to the bar that when the latter is in a position at right angles to the length of the cable by reason of the continuous current flowing therethrough the pointer will be directed toward the fault or leak in the cable. By passing along the cable and placing the indicating device 16 above the cable at successive manholes the observer may locate the direction of the fault.

If it be assumed, for instance, that the fault is at the point X, then the indicator will point toward the right hand when placed in the position shown in full lines in Fig. 1, for instance. If the indicator be moved inward to the point indicated in dotted lines, then the indicator will point toward the left hand, and in this manner the exact position of the fault may be determined. If the first observations are taken at a manhole including, say, the points 20 and 21, the indication of the needle would be toward the right hand upon each conductor 3 and 4, but an indication would be shown upon the conductors 5 and 6 in opposite directions, so that the observer would know that the fault was upon the circuit 3 4.

For the purpose of causing the bar 19 to stand in a direction more or less parallel to the length of the cable when the characteristic current is not flowing through the line, not even though the surrounding conditions would tend to place it in some different position, an adjustable magnet 22 may be employed, and by swinging this to the proper position the desired initial position may be given to the bar 19. This magnet may be any suitable form of permanent magnet capable of being turned upon a pivot central with reference to the indicator 18, so as to give to the indicator an initial position in alinement with the cable, so that it will tend to swing when subjected to the influence of the indicating-currents.

As already stated, the invention is applicable for use on circuits where continuous currents are employed, the general arrangement being the same as already described, with the exception that the indicating device instead of being a compass is, as indicated in Fig. 3, an inductive device responsive to the direct currents transmitted from the supplemental source. Such a device may consist of conductors 23, capable of being placed parallel to the cable or main conductor and having included in their circuit an indicating device 24, responding to the induced currents set up in the conductor 23 acting as a secondary to the main line. These conductors placed parallel to the mains are arranged so as to neutralize the variations in the working currents, which may be changing in value and would otherwise interfere with the signals. The indicating device consists of an instrument that gives a kick or throw of the needle, as in a ballistic galvanometer 24, and it is the direction and kick in reference to the cable in connection with the make-and-break apparatus that determines the direction of the fault.

In Fig. 3 I have shown a modified arrangement of apparatus in connection with the supplemental generator 8, consisting in the interposition of a transformer or some other device suitable for preventing the currents on the main circuit from reaching the supplemental source. For instance, the coil 11 is here made the primary coil of the transformer 29 and has its terminals connected around resistance 25 and the supplemental source 8, while the secondary coil 11ª of the transformer has one terminal connected by the conductor 9 with the earth and the other terminal connected with the line-wire 3. The introduction of the transformer serves to prevent the direct currents on the main circuit from reaching the supplemental source 8. The break or fault in the conductor 4 is indicated at X. The indicating device may be constructed with two branches 26 and 27, adapted to be placed in parallel relation with reference to the two legs 3 and 4 of the circuit and connected up so that the variations in the normal working current of the line will induce an opposing impulse in the branches with reference to the indicator 8. Then when a supplemental current is caused to traverse the circuit from the source 8 the portion passing through the conductor 3 and by way of the work-circuit to the point X will at the moment of its increase induce a current in the branch 27 in a given direction, and the portion passing through the conductor 4 will likewise induce in the branch 26 an impulse in the same direction, and the two together will cause the galvanometer or indicating device 8 to point for an instant in a given direction, being toward the break or fault. The indicator will then immediately return to its normal position; but on the cessation of the supplemental current it will in like manner receive an impulse in the opposite direction. Inasmuch as the time intervals between the successive impulses differ from the duration of the successive impulses, it may be readily determined in which direction the supplemental current is flowing, hence which movements of the needle are toward the break. It is not always necessary that this indicating device should be applied to both branches of the circuit, as the changes in the normal working current may not always be such as to materially interfere with the reading of the indications given by the supplemental current.

I claim as my invention—

1. The hereinbefore-described method of locating faults upon cables carrying electric currents, which consists in transmitting through the cable an electric current having a characteristic differing from that of the normal current upon the cable, and causing such current to pass through the fault and indicating the direction of flow of such supplemental current.

2. The hereinbefore-described method of locating a fault upon an electric circuit, which consists in superposing upon the normal current of a circuit, a current having a different characteristic, causing such current to traverse the fault, and indicating the direction of the fault through the instrumentality of such supplemental current.

3. The method of locating faults upon electric circuits, which consists in causing a characteristic electric current to flow through different portions of the circuit toward the fault, and producing by such characteristic current an electromagnetic effect dependent upon the direction of flow of current in contiguous portions of the circuit.

4. The method of locating a fault or leak upon a system of electrical distribution, which consists in utilizing such leak as a path for electric currents independent of the working currents on the circuit, and indicating the direction of flow of the first-named currents at different points upon the circuit, substantially as described.

Signed at New York, in the county of New York and State of New York, this 12th day of March, A. D. 1901.

THOMAS W. VARLEY.

Witnesses:
 WM. H. CAPEL,
 EDWARD J. DOLAN.